(12) United States Patent
Meyer (10) Patent No.: US 9,086,171 B2
(45) Date of Patent: Jul. 21, 2015

(54) KUSC POSITIVE RETURN VALVE ACTION (71) Applicant: Ken Meyer, Fridley, MN (US)

(72) Inventor: Ken Meyer, Fridley, MN (US)

( * ) Notice: Subject to any disclaimer, the term of this patent is extended or adjusted under 35 U.S.C. 154(b) by 446 days.

(21) Appl. No.: 13/678,501

(22) Filed: Nov. 15, 2012

(65) Prior Publication Data
US 2014/0131605 A1 May 15, 2014

(51) Int. Cl.
F16K 31/44 (2006.01)
F16K 31/528 (2006.01)

(52) U.S. Cl.
CPC .............. F16K 31/44 (2013.01); F16K 31/528 (2013.01)

(58) Field of Classification Search
CPC . F16K 31/44; F16K 31/528; F16K 31/52408; F16K 31/524
USPC ......... 251/279, 229; 123/41.41, 90.24, 90.25, 123/90.26, 90.42
See application file for complete search history.

(56) References Cited

U.S. PATENT DOCUMENTS

| 577,589 | A | | 2/1897 | Teubert | |
|---|---|---|---|---|---|
| 1,671,973 | A | * | 6/1928 | Anderson | 123/90.25 |
| 2,111,735 | A | | 3/1938 | Riley | |
| 2,832,327 | A | | 4/1958 | Lorenz | |
| 2,937,633 | A | | 5/1960 | Lorenz | |
| 2,954,017 | A | * | 9/1960 | Forstner | 123/90.16 |
| 4,036,185 | A | | 7/1977 | Key | |
| 4,898,130 | A | | 2/1990 | Parsons | |
| 5,016,581 | A | | 5/1991 | Parsons | |
| 5,078,102 | A | | 1/1992 | Matsumoto | |
| 5,080,054 | A | * | 1/1992 | Nakamura | 123/90.16 |
| 6,439,177 | B2 | * | 8/2002 | Pierik | 123/90.16 |
| 6,491,008 | B1 | * | 12/2002 | Zubeck | 123/90.16 |
| 6,619,250 | B2 | | 9/2003 | Folino | |
| 6,644,255 | B1 | | 11/2003 | Henry | |
| 7,077,088 | B1 | * | 7/2006 | Decuir, Jr. | 123/90.24 |
| 2008/0121197 | A1 | * | 5/2008 | Flierl | 123/90.16 |

* cited by examiner

Primary Examiner — John K Fristoe, Jr.
Assistant Examiner — Andrew J Rost (57) ABSTRACT A kinetically unyielding, statically compliant (KUSC) positive return valve action. In one embodiment, a guide is pivotally mounted and rotationally abuts a limiting bench. A pin mounted slidably on the guide is linked to a poppet valve, a driver positioning the pin along the guide. With the valve seated and the driver overtraveled a deflection opens up between the guide and the limiting bench that resolves the overtravel, which deflection is opposed by a forcing spring. As the valve is initially lifted, valve-lift kinetic force is buttressed against the guide mount and the limiting bench, neither of which yields. With increasing lift the pin position passes the guide mount axis to be cantilevered on the guide at maximal valve lift against valve-return kinetic force: this also is unyieldingly buttressed. The action is adjusted by positioning the limiting bench either manually or by hydraulic lash adjuster.

20 Claims, 6 Drawing Sheets

KUSC POSITIVE RETURN VALVE ACTION

TECHNICAL FIELD

This invention pertains to mechanical actions that cyclically position poppet valves, and particularly to positive return poppet valve actions.

BACKGROUND OF THE INVENTION

Hundreds of millions of internal combustion engines in today's civilization employ poppet valves in the cylinders of those engines to allow intake gases to enter and exhaust gases to exit the engine cylinders. The valves are each translated cyclically between a seated position and a position of maximum lift. The predominant type of valve-lifting action in use is a spring-return action, in which a cam member imparts lift to a valve. The valve is then restrained at its greatest lift by spring forces that return it to its seated position. This is, however, less than ideal for many important reasons.

The magnitude of spring force that must be employed to return a valve to its seat is defined by the maximum kinetic force the valve's intended movement produces, which occurs at the engine's highest rotational velocity. But this spring force, permanently built into the action, must then be opposed by the valve lift mechanism with each and every revolution of the engine. Thus even at lower engine speeds, at which most engines are usually operated, valve-lifting components suffer from kinetics which occur only at high speed. Typical among these components is the cam's driving belt, which is subject to shearing of its teeth even at engine startup. Further, at high engine RPMs the valve kinetic forces can in practice actually exceed the spring restraints and produce so-called "valve float," in which a valve makes an uncommanded departure from its engagement against the lift imparting surface of its cam. This inhibits engine performance strongly.

Spring-return actions typically flex the spring the entire distance of the valve's motion, which places deep repetitive stress cycling on the spring. Spring failure is known to occur thus, resulting in catastrophic contact between the valve and other engine components. Another problem with spring-return actions is that the spring itself has a mass and is moved vigorously in operation. This makes the spring oscillate internally and this oscillation is known to bounce the valve open once it has been seated, the spring then re-seating it. This produces engine inefficiencies.

A spring-return action must deliver force to accelerate its valve from its seat and simultaneously overcome the spring force on that valve. This double-loading tends to overload the driving cam face and its cam follower, resulting in metallurgical distress to each. Further, the double-loading places heavy cyclic torsional loading on the cam itself, causing a pulsing feedback through its driving components. Cams are known to suffer torsional resonance and breakage under their double-loading.

Industry has adopted cam-lift profiles to drive the valves in their cycles, which profiles are moderate kinetically. While assisting slightly in the issues described above, these moderated profiles compromise cylinder ventilation. Less powerful engines with more pollution and worse fuel efficiency are the result.

A valve action that does not depend on spring force for the return of its poppet valve to a seated position has been applied with some success in industry. This is called a "positive return" action, also known as "desmodromic." A positive return action relies on mechanical engagement between a driving member, usually a cam, and its driven valve to return the valve to its seated position. Thus the kinetics of valve return are provided for, without resort to a spring.

Yet for all the advantages the positive return action offers, it comes with one very definite design issue. Whatever the mechanism is that drives the return of the valve to its seat, it either 1) exactly stops its drive at the seat, or 2) its drive does not seat the valve, or 3) it overtravels the seated position.

For a positive return valve action to exactly stop driving its valve at the seat is possible for a newly adjusted valve that experiences no significant thermal expansion. Yet a valve is in constant flux of seating-precision due to extremes of thermal influences and to erosion of its valve seat in usage. As a result, expensive and mechanically demanding maintenance of such actions limits their practicality.

For a valve action to not return the valve to its seat means leakage of gases under high pressure and temperature past the valve. This causes inefficiency of the engine and can cause the valve to become overheated and thus get warped and scorched.

When a valve is seated and then urged a distance further by its driving mechanism, "overtravel" of the valve drive is entered. For a rigid driving mechanism, overtravel causes excessive noise and rapid valve seat regression, and can cause fracture of critical components.

To resolve overtravel issues in desmodromic actions, many designs provide yielding at valve seating by incorporating a short-acting spring into the valve linkage. Whereas this can produce acceptable valve seating in overtravel, it also leaves a kinetic problem in place at the valve's greatest lift. Specifically, the suspension of the valve mass on its spring while undergoing extreme kinetic vigor results in deflection of the valve past its intended limit of motion. Heavy spring force must then be used to restrain the valve mass, which in turn causes the valve seating force to be excessive. Oscillations of the valve-mass and spring system can also result that cause the valve to experience re-seating.

Although hydraulic actuators and electromechanical (EM) actuators may be employed as drivers to directly position poppet valves, such positive return actions require an exacting valve landing precision that is expensive and technically difficult to attain. An EM actuator may require significant electrical power to maintain valve seating, due to a powerful spring in the action that accelerates the valve from its seat.

Ballot, in U.S. Pat. No. 1,633,882 teaches a cam follower that contacts a lifting-cam surface with one follower arm and also contacts a returning-cam surface with another follower arm. The follower is thus continuously in contact with both driving lobes of a single cam. To allow for overtravel during valve seating, a resilient member forces a returning-cam contact face against the cam. This places unending contact force against the cam lobes which results in wear and friction.

Parsons, in U.S. Pat. No. 4,898,130 teaches a pivoting guide member with a pin member moved along it. The pin member's movement within the guide member causes the guide member to positively return its linked valve nearly to its seat. The spring that forces the guide member to seat the valve is flexed through the entire valve travel range, placing deep repetitive stress cycling on the spring. The spring force on the guide member is leveraged against the pin member as the valve approaches its greatest lift. This produces excessive friction and wear on the guide and pin members.

SUMMARY OF THE INVENTION

The instant invention is a positive return poppet valve action that yields during overtravel and regularly operates without yielding to the kinetic forces of the valve's accelerations. The valve action may be called kinetically unyielding, and its yielding during overtravel may be called static compliance. Thus, this invention is a kinetically unyielding, statically compliant (KUSC) valve action.

In the invention, a limiting bench unyieldingly limits a position of a compliance member by an abutment. The abutment is urged by a forcing member, typically a spring. With the action in overtravel the abutment deflects to resolve the overtravel, by which deflection the forcing member applies seating force to the valve. The geometry of the action is arranged such that, in one embodiment, the abutment is forced by valve kinetic positioning forces at maximal valve lift. In another embodiment, the effect of the forcing member is leveraged through the compliance member to ensure that the abutment remains in effect at maximal valve lift.

Figure 1:
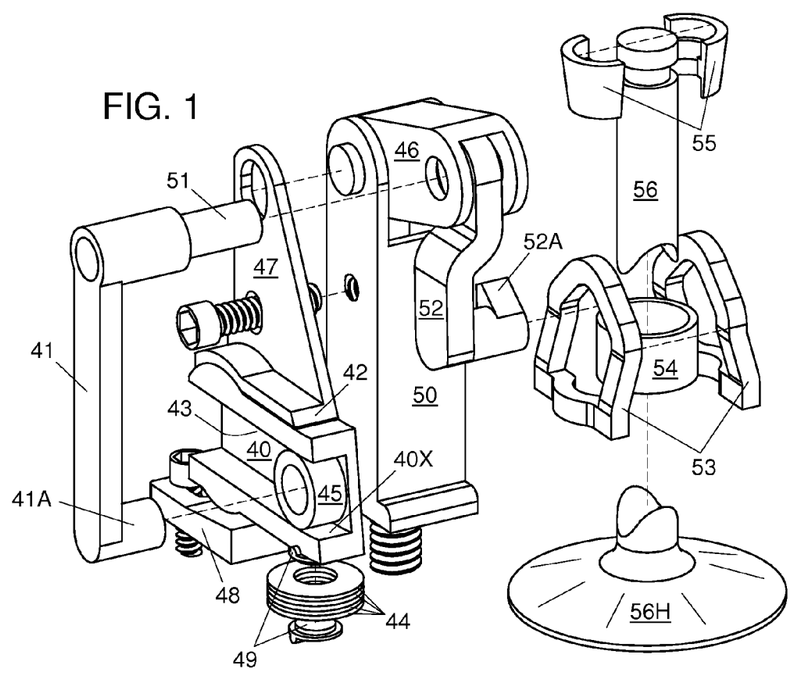
FIG. 1 shows an exploded view of the FIG. 2 action at overtravel.
Figure 2:
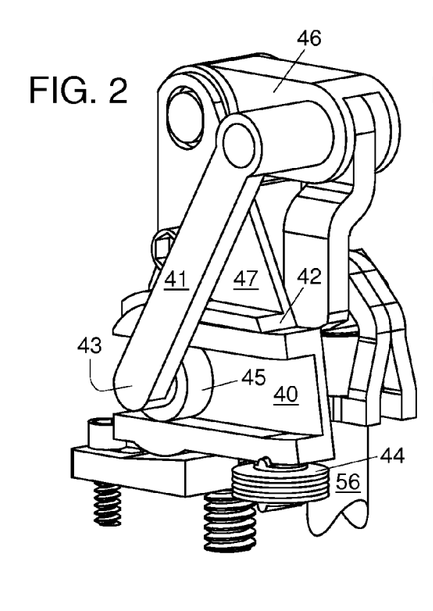
FIG. 2 shows an "hypotenuse" embodiment of a Case 1 action at mid-lift.
Figure 3:
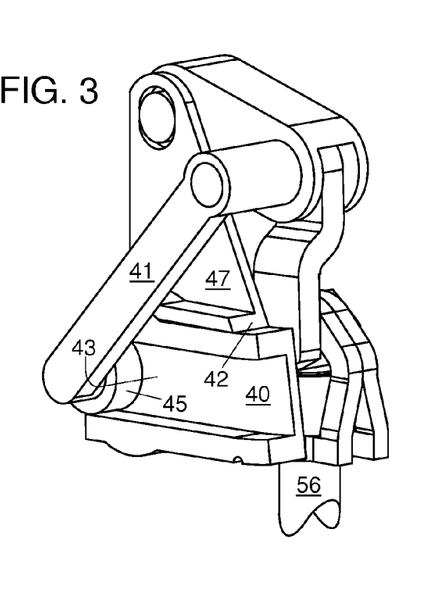
FIG. 3 shows an isolated view of the FIG. 2 action at apogee.

One embodiment of the invention is shown as FIGS. 1-3 in the drawings and is briefly described following. A driver cyclically positions a pin along a guide's slot, with the guide pivotably mounted and the pin linkedly driving a valve. A limiting bench limits a rotation of the guide, and a spring urges the guide against the limiting bench. With the driver in overtravel, a deflection of the guide from the limiting bench resolves the overtravel, the spring's force also seating the valve. As the pin is driven along the guide the deflection vanishes and becomes engagement against the limiting bench. This engagement both of, lifts the valve and solidly buttresses valve-lifting force. As the pin passes the pivot mount of the guide, the force on the valve begins to be reversed due to the motion profile of the driver. This reversed force is also solidly buttressed against the limiting bench due to the cantilever of the guide from its pivot. As the pin returns past the pivot mount towards its overtravel position, deceleration force on the valve is buttressed against the limiting bench as with valve-lifting force previously.

Valve acceleration forces, in the above embodiment, are buttressed against unyielding members of the action. Valve seating force is by a spring that only flexes at overtravel, a very short distance, and the spring can be strong or weak. The action is easily adjusted, both initially and periodically. The force that seats the valve is not experienced by the pin when the valve is in lift, and the valve seating force does not transmit itself back to the driver with the driver in overtravel. The action can be driven by mechanical means, such as a cam and follower with associated linkages. It also may be driven by hydraulic or electromechanical means, especially since the action features soft valve landings that require no exacting precision and since no holding-force is required of the driver at valve seating.

BRIEF DESCRIPTION OF THE DRAWINGS

FIG. 9 schematically displays a Case 1 embodiment adapted for an outward-opening poppet valve.

FIG. 14 schematically displays a Case 2 embodiment.

DETAILED DESCRIPTION OF THE DRAWINGS

In each embodiment of the invention its valve is translated cyclically through a seated position, a vestigially-lifted "perigee" position, and a maximally-lifted "apogee" position. The valve action itself may be referred to as being in the position of its valve. "Overtravel" is entered with a valve at seated position, past which it can not be driven, yet its valve action is urging it a distance further. An action that is seated may also be in overtravel.

In this Specification, a "valve stem" is the valve stem portion of a poppet valve.

FIG. 1 shows an exploded view of the action of FIG. 2, with the action at overtravel. Also shown is a valve head 56H portion of a poppet valve. A valve stem 56 passes above its valve head 56H through a deck (not shown) and is retained by a pair of conically tapered gripes 55 nested in a gripe bucket 54, which is shaped to retain the gripes 55 in one direction. Gripe bucket 54 is embraced by a pair of hangers 53, which are slung on a hook 52, which includes a tang 52A. Tang 52A retains the hangers 53 on hook 52, which during assembly is rotated to allow tang 52A to slip through headroom between the hangers 53 and gripe bucket 54. A tower 50 is screwed to the deck and an arm 46 is pinned rotatably into tower 50. A mount 47 comprises two oval slots, one of which is fit over an end of the arm 46 pin, while a screw is fit through the other slot and threaded into tower 50. A mount 48 has one wedge-shaped portion and has a flat face that is set on the deck, to which it is screwed through an adjusting slot. A guide 40 is slipped against tower 50, with one cylindrical boss below mount 47 and one boss coaxial to it against mount 48, thus establishing a stationary rotational mount of guide 40 at a guide axis 43. Two series-pairs of forcing disc-springs 44 are bracketed by a pair of caps 49 and compressed and fit between the deck and guide 40. Each cap 49 is half-cylindrical on one face so as to rock slightly in operation, and both of guide 40 and the deck are machined to fit these faces.

An output link 41 includes a pin gudgeon 41A, about which one end of a driver (not shown) and a pin roller 45 are journaled. An axle 51 pins hook 52 rotatably into arm 46, and output link 41 is journaled on axle 51 with pin roller 45 slidably positioned on guide 40. Thus, pin roller 45 is linked to valve stem 56. Since both the inner and the external cylindrical faces of pin roller 45 are capable of rotation with respect to their contacting members, each of those faces is "rotatably" mounted. With pin roller 45 in overtravel, both of mount 47 and mount 48 are snugly adjusted to place guide 40 at a height that fixes a suitable gap between guide 40 and mount 47 at a region, limiting bench 42.

A null arc 40X is an extension of guide 40 that is arced about the FIG. 1 position of axle 51 to allow pin roller 45 past its FIG. 1 position without moving either axle 51 or guide 40.

FIG. 2 shows the "hypotenuse" action at mid-lift. An isolated view of the action at apogee is shown in FIG. 3. Of particular note is the contact between guide 40 and limiting bench 42 in both figures.

Figure 4:
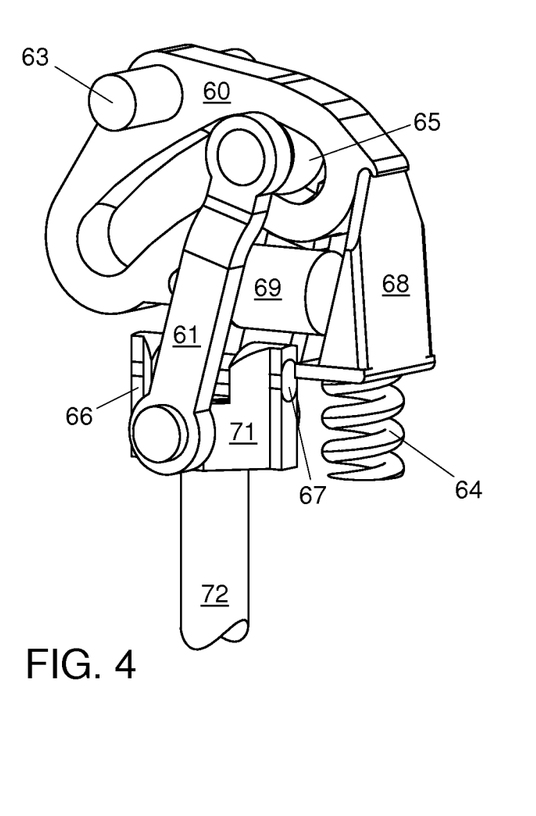
FIG. 4 shows a "high track" embodiment of a Case 1 action at overtravel.
Figure 5:
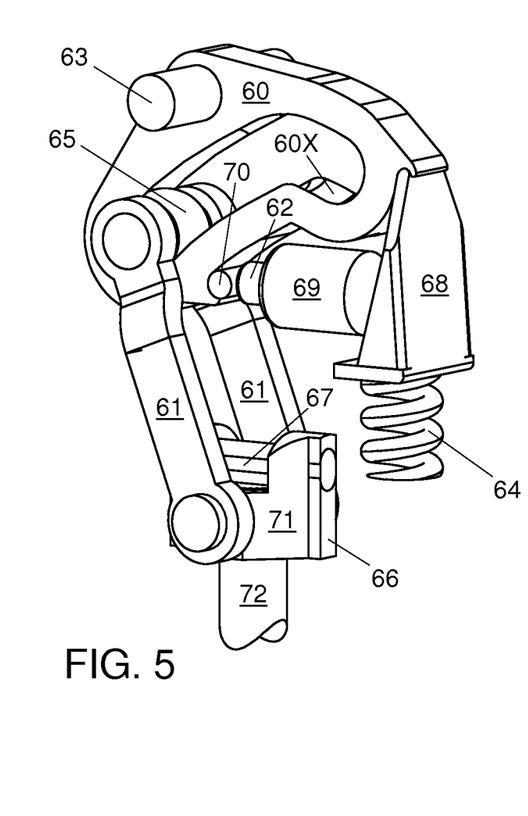
FIG. 5 shows the FIG. 4 action at apogee.

FIG. 4 shows the "high track" action at overtravel and FIG. 5 shows it at apogee. A guide axle 63 is mounted to a frame (not shown) and journals a guide 60, on which a pin roller 65 that is spherically shaped and bored is deployed. From a gripe bucket 71 two gudgeons protrude, on each of which an end of an output link 61 is journaled. Two ferrules of a driver (not shown) bracket pin roller 65 and are journaled with it on a pin that is pressed through the output links 61. Gripe bucket 71 comprises two laterals 66 that serve to guide gripe bucket 71 in the frame. A valve stem 72 is mounted in gripe bucket 71 and retained by a bar 67. Thus, pin roller 65 is linked to valve stem 72. A forcing spring 64 and an HLA body 69 are mounted on the frame, forcing spring 64 urging a push rod 68 against guide 60. An hydraulic lash adjuster (HLA) comprises HLA body 69 and a limiting bench 62, which is the HLA's piston member. Limiting bench 62 abuts a nosepiece 70 that is affixed as a hardened member to guide 60. A null arc 60X is an extension of guide 60 that is arced about the FIG. 4 position of the gripe bucket 71 gudgeons to allow pin roller 65 past its FIG. 4 position without moving either gripe bucket 71 or guide 60.

Figure 6:
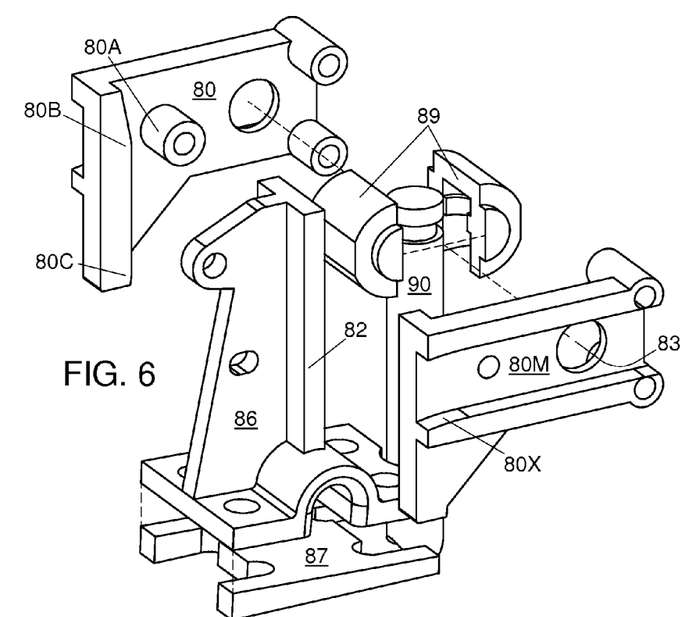
FIG. 6 shows an isolated exploded view of the FIG. 7 action at mid-lift.
Figure 7:
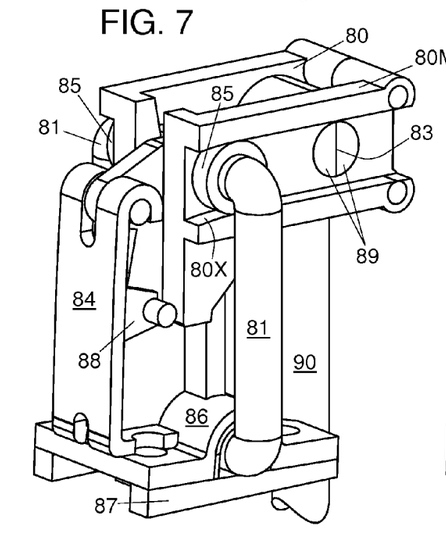
FIG. 7 shows an "elevator" embodiment of a Case 1 action at overtravel.

FIG. 6 shows an isolated exploded view of the action of FIG. 7 at mid-lift. A guide half 80 and its minor-image guide half 80M together bracket a pylon 86, and about a guide axis 83 journal two gripes 89 assembled together that retain a valve stem 90. Guide half 80 and guide half 80M each have three bored bosses through which they are pinned together forming an "80-body," the mirrored features of which body are here referred to in common. Thus the 80-body is linked to valve stem 90, which passes through a deck (not shown). Shown on guide half 80 is a bored boss 80A; a leg extension of guide half 80 includes regions shoulder 80B and tail 80C. Boss 80A rides against a slab face of pylon 86 and shoulder 80B rides against an opposite face of the same slab. A slanted face of guide half 80 at shoulder 80B allows guide half 80 to rotate slightly in one direction, generally about shoulder 80B. Tail 80C is the region on guide half 80 most distant from shoulder 80B that contacts pylon 86. Each tail 80C contacts a region on pylon 86 that is referenced as a limiting bench 82. Pylon 86 snugly and rotatably receives a uni-bracket 81 (FIG. 7) that is generally U-shaped; pylon 86 is mounted with it on a slotted, wedge-shaped plate 87 and partially screwed to the deck. Pylon 86 includes an oval slot that has an axis parallel to the deck. A null arc 80X is an extension of guide half 80M that is arced about the rotational axis of uni-bracket 81 in FIG. 7 to allow uni-bracket 81 past its FIG. 7 position without moving the 80-body.

Figure 8:
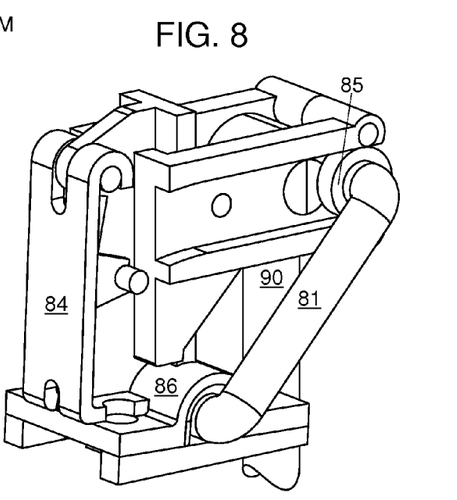
FIG. 8 shows the FIG. 7 action at apogee.

FIG. 7 shows the "elevator" action at overtravel. Two ferrules of a driver (not shown) outboard of two pin rollers 85 are journaled with them on respective coaxial ends of uni-bracket 81. The pin rollers 85 are slid onto slots on the 80-body. A forcing leaf-spring 84 is placed on pylon 86 and two screws fasten them through plate 87 to the deck. A pusher 88 is fit between forcing leaf-spring 84 and a pin that is slid through the oval slot in pylon 86, which pin presses against the 80-body. The top of forcing leaf-spring 84 is then pinned through a bore in pylon 86 such that forcing leaf-spring 84 urges tails 80C against limiting benches 82. With the deck mounting screws slightly loosened, plate 87 is adjusted to place a suitable gap between tails 80C and limiting benches 82 and the screws are tightened. FIG. 8 shows the action of FIG. 7 at apogee.

Figure 9:
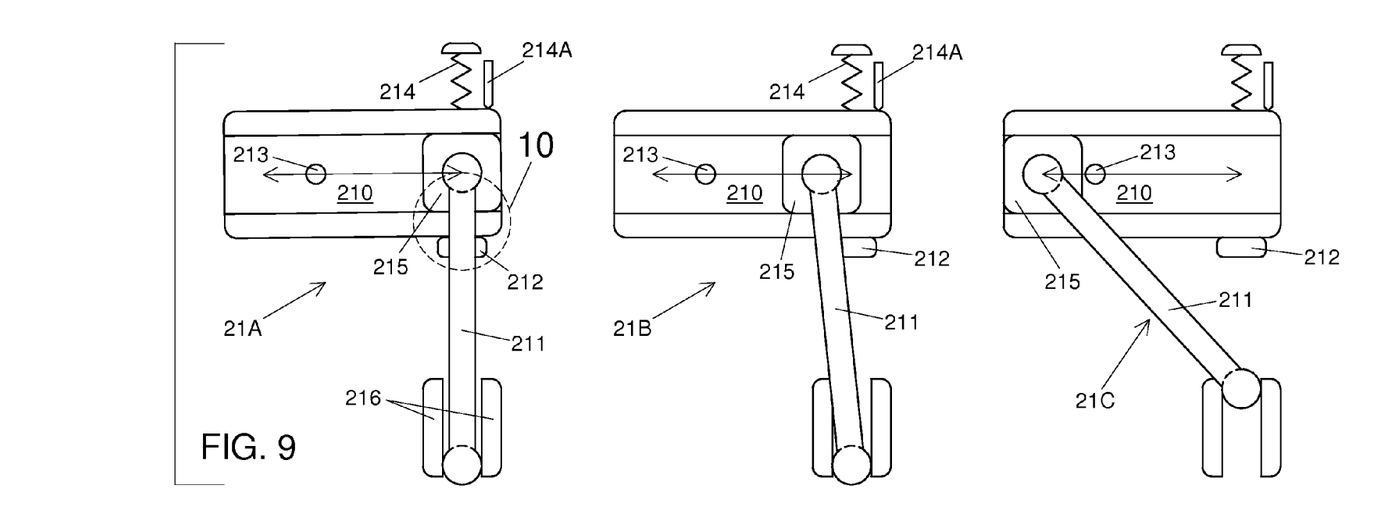
FIGS. 9 and 14 are schematics that each shows its embodiment of the invention thrice: in the valve action positions of overtravel, perigee, and apogee.

Schematic FIG. 9 shows a unit 21A, a unit 21B, and a unit 21C. These are identical to each other except for position: unit 21A is at overtravel, unit 21B is at perigee, and unit 21C is at apogee.

Unit 21A comprises members 210-216 and forcing helper 214A. Output link 211 is journaled at one end into pin block 215 and the ferrule of a driver (not shown), and the other end is slidably mounted between two laterals 216 and is linked to an outwardly opening poppet valve (not shown). Pin block 215 is slidably mounted on guide 210, which is rotatably mounted at guide axle 213 to a frame (not shown). Limiting bench 212 and the laterals 216 and the base of forcing spring 214 are mounted to the frame, and forcing spring 214 urges guide 210 into engagement against limiting bench 212. Forcing helper 214A is an additional forcing member urging guide 210 against limiting bench 212, especially at valve seating. An arrow indicates the path that pin block 215 describes.

Figure 10:
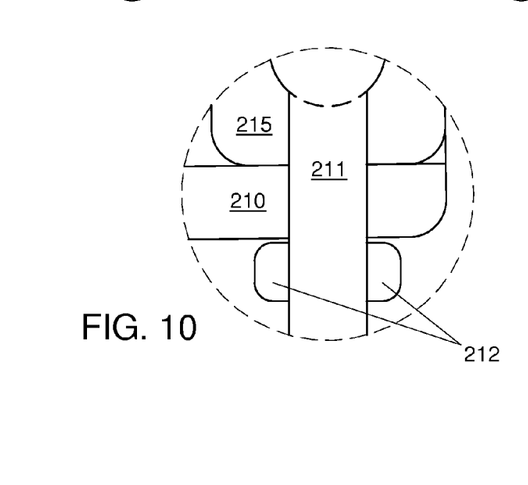
FIG. 10 is an enlargement from FIG. 9.

FIG. 10 is an enlargement from unit 21A in FIG. 9. Of particular note is the deflection between guide 210 and limiting bench 212.

Figure 11:
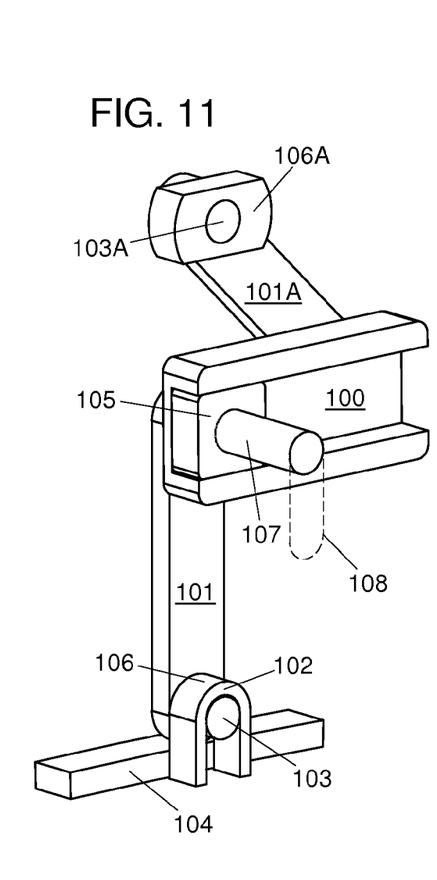
FIG. 11 shows an isolated view of the FIG. 12 action at overtravel.
Figure 12:
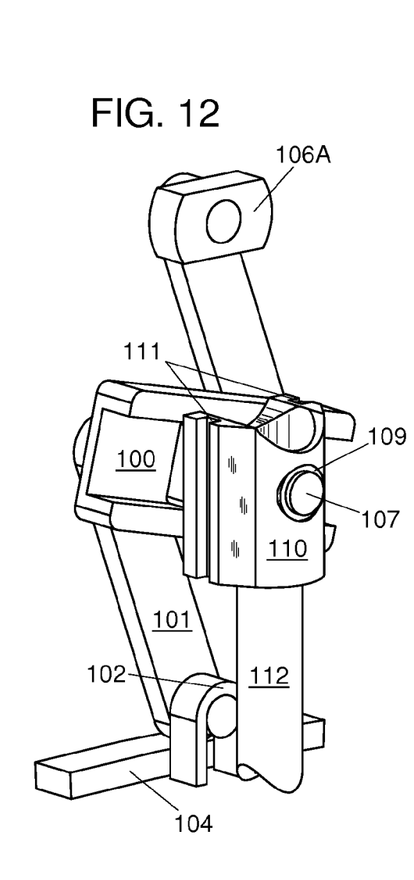
FIG. 12 shows a "porch swing" embodiment of a Case 1 action at mid-lift.

FIG. 11 shows an isolated view of the action of FIG. 12 at overtravel. A bracket 106A and a bracket 106 are mounted to a frame (not shown). An arm 101 includes a gudgeon 103 that is slidably mounted in bracket 106, and an arm 101A includes a gudgeon 103A that is journaled into bracket 106A. A forcing leaf-spring 104 mounted on the frame resiliently bears against arm 101, thus urging gudgeon 103 against bracket 106 at a region, limiting bench 102. Each of, arm 101 and arm 101A, is journaled at one end onto its own gudgeon on a guide 100. Each of these gudgeons, that journal arm 101 and arm 101A, is coaxial with the axis of a pin axle 107 at, respectively, overtravel and apogee. Guide 100 slidably mounts a pin block 105, from which pin axle 107 extends. An outline 108 indicates the range of motion of pin axle 107 in operation, its centerline sharing a plane with the axes of gudgeon 103 and gudgeon 103A. A driver (not shown) positions arm 101A. Of particular note is the deflection between gudgeon 103 and limiting bench 102.

Figure 13:
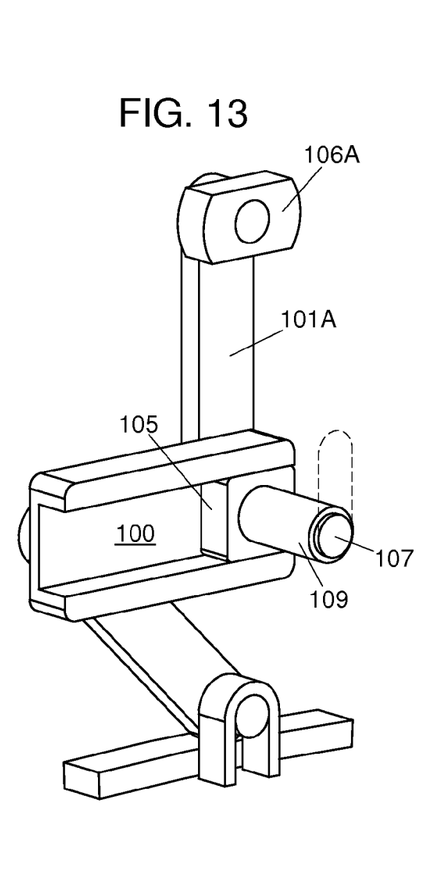
FIG. 13 shows an isolated view of the FIG. 12 action at apogee.

FIG. 12 shows the "porch swing" action at mid-lift. A valve stem 112 is mounted in a gripe bucket 110 and retained by a bushing 109, which is journaled about pin axle 107. Thus, pin block 105 is linked to valve stem 112. On gripe bucket 110 a pair of laterals 111 guide gripe bucket 110 within the frame. FIG. 13 shows an isolated view of the action of FIG. 12 at apogee.

Figure 14:
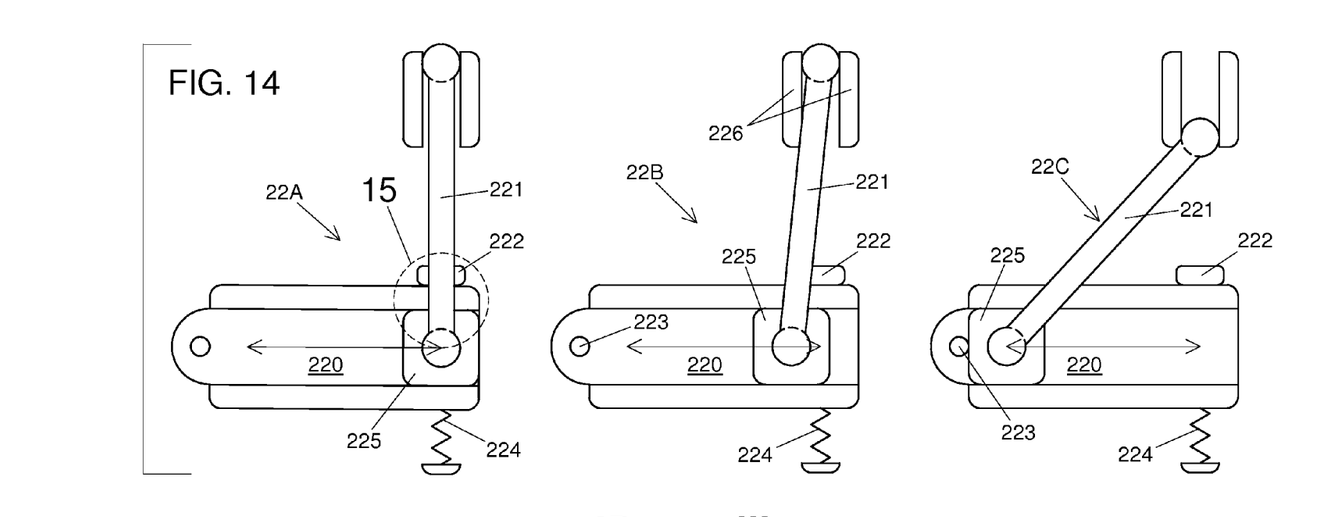

Schematic FIG. 14 shows a unit 22A, a unit 22B, and a unit 22C. These are identical to each other except for position: unit 22A is at overtravel, unit 22B is at perigee, and unit 22C is at apogee.

Unit 22B comprises members 220-226. Output link 221 is journaled at one end into pin block 225 and the ferrule of a driver (not shown), and the other end is slidably mounted between two laterals 226 and is linked to a valve (not shown). Pin block 225 is slidably mounted on guide 220, which is rotatably mounted at guide axle 223 to a frame (not shown). Limiting bench 222 and the laterals 226 and the base of forcing spring 224 are mounted to the frame, and forcing spring 224 urges guide 220 into engagement against limiting bench 222. An arrow indicates the path that pin block 225 describes.

Figure 15:
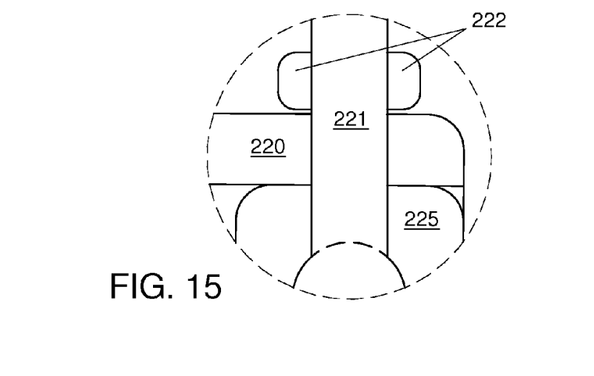
FIG. 15 is an enlargement from FIG. 14.

FIG. 15 is an enlargement from unit 22A in FIG. 14. Of particular note is the deflection between guide 220 and limiting bench 222.

Operation of the Invention

"Kinetic positioning force" arises from a valve action cyclically translating its valve. The kinetic positioning forces include: an "outgoing force," which takes place between perigee and approximately mid-lift, that accelerates the valve away from its seat; and a "returning force," which takes place between approximately mid-lift and apogee, that accelerates the valve towards eventual seating.

Each embodiment of the invention comprises a compliance member, a position of which is unyieldingly limited by an operative engagement against a limiting bench. This engagement is realized as an abutment, deflection from which abutment resolves overtravel and is opposed by a forcing member. Since valve seating is necessarily opposite in direction to valve lift, in every embodiment outgoing force at perigee forces the abutment.

A "Case 1" action's returning force at apogee non-negatively forces the action's abutment. A "Case 2" action's returning force at apogee opposes the action's abutment and thus is buttressed partially against its forcing member(s).

FIGS. 1-3 show the "hypotenuse" embodiment of a Case 1 action.

A driver (not shown) cyclically positions pin roller 45 along guide 40 between overtravel and apogee according to a predetermined velocity profile, thus cycling valve stem 56 between seated position and apogee. Guide 40 is the embodiment's compliance member, limited in its rotation by an abutment against mount 47 at limiting bench 42. Overtravel of pin roller 45 (FIG. 1) is resolved by deflection of guide 40 from limiting bench 42. The forcing disc-springs 44 oppose the deflection and effect a force between guide 40 and pin roller 45 that provides seating force to valve stem 56. As pin roller 45 is driven from overtravel, deflection between guide 40 and limiting bench 42 vanishes and by contact between guide 40 and limiting bench 42, valve head 56H is lifted from its seat thus entering perigee. With this contact in effect, each position of the driver determines a corresponding position of the valve. Further movement of pin roller 45 lifts the valve through mid-lift (FIG. 2) to apogee (FIG. 3), where the motion of pin roller 45 reverses towards valve seating. Outgoing force (between perigee and mid-lift) is solidly buttressed against limiting bench 42 and the guide axis 43 mounting. Returning force (between mid-lift and apogee) is also solidly buttressed against limiting bench 42 and the guide axis 43 mounting, since guide 40 is cantilevered from and rotates about guide axis 43. As valve stem 56 returns from mid-lift towards perigee, outgoing force softens the landing of valve head 56H on its seat, completing the valve lift cycle.

An option for adjusting valve-open-dwell duration may be practiced through the use of an extended-overtravel region, null arc 40X, near the end of guide 40. Valve-open-dwell duration, ideally, is variable with engine speed for greater engine efficiency and for minimizing pollution. With this option, the position of pin roller 45 at its FIG. 1 overtravel extremity is modified by external means (not shown) to extend into null arc 40X. The driven range of pin roller 45 remaining constant, the apogee location of pin roller 45 on guide 40 is thereby shortened. Pin roller 45 arrives at perigee from extended-overtravel later and the return to perigee from apogee is sooner, as compared to the unmodified cycling (FIGS. 1-3) of the action. A valve-open-dwell duration results that is rather effortlessly variable, from a full dwell period to a shorter dwell period.

FIGS. 4-5 show the "high track" embodiment of a Case 1 action.

A driver (not shown) cycles pin roller 65 along guide 60, which is the embodiment's compliance member, between overtravel (FIG. 4) and apogee (FIG. 5). Valve stem 72 is cycled between seated position and apogee by pin roller 65 in guide 60. Forcing spring 64 through push rod 68 urges guide 60 into engagement, through nosepiece 70, against limiting bench 62. At overtravel, forcing spring 64 provides seating force to valve stem 72. Though the hydraulic lash adjuster (HLA body 69 and limiting bench 62) keeps overtravel displacement to nearly zero, excursions into significant overtravel displacement are resolved by deflection of guide 60 from its engagement against limiting bench 62. Guide axle 63 is located normal to the path of pin roller 65 in guide 60 where pin roller 65 is at mid-lift. Outgoing force is solidly buttressed against limiting bench 62 and guide axle 63. Returning force is also solidly buttressed against limiting bench 62 and guide axle 63, since guide 60 rotates about guide axle 63.

Null arc 60X is an extended-overtravel region found at one end of the slot of guide 60, which may be used to provide essentially the same valve-open-dwell variation as that described with the hypotenuse embodiment.

FIGS. 6-8 show the "elevator" embodiment of a Case 1 action.

A driver (not shown) cycles the pin rollers 85 along the 80-body, which is the embodiment's compliance member, between overtravel (FIG. 7) and apogee (FIG. 8). This cycles valve stem 90 between seated position and apogee. Overtravel of the pin rollers 85 is resolved by deflection of tails 80C from an abutment against pylon 86 at each's respective limiting bench 82. Forcing leaf-spring 84 provides force that opposes the deflection and imparts moment to the 80-body about shoulders 80B, thus providing seating force to valve stem 90. At mid-lift, the axis of the pin rollers 85 is generally collinear with guide axis 83. Outgoing force through the pin rollers 85 produces a moment in the 80-body about the 85-axis that is solidly buttressed by, tails 80C against limiting benches 82 and the bosses 80A contact with pylon 86. Returning force is similarly buttressed, since the 80-body also rotates about guide axis 83.

Null arcs 80X are an extended-overtravel region found at one end of the guide slots of the 80-body, which may be used to provide essentially the same valve-open-dwell variation as that described with the hypotenuse embodiment.

Schematic FIG. 9 shows a Case 1 action adapted for an outward-opening poppet valve.

A driver (not shown) cycles pin block 215 through overtravel, perigee, and apogee. Pin block 215 cycles the valve (not shown) between seated position and apogee. Overtravel (unit 21A and FIG. 10) is resolved by deflection of an abutment between guide 210, which is the embodiment's compliance member, and limiting bench 212. The deflection is opposed by force from forcing spring 214 that seats the valve. As pin block 215 is moved from overtravel to perigee (unit 21B), the deflection vanishes and the valve is in lift. At mid-lift, the axes of pin block 215 and guide axle 213 are generally collinear. Outgoing force is solidly buttressed against limiting bench 212 and guide axle 213. Returning force is also solidly buttressed against limiting bench 212 and guide axle 213 since guide 210 rotates about guide axle 213.

Forcing helper 214A applies force against guide 210, especially at valve seating, to oppose pressure built up on the face of the outward-opening valve. Forcing helper 214A is linked to means (not shown) independent of the valve action, for instance a piston that is in communication with the chamber that the valve seals. With forcing helper 214A countering pressure on the closed-valve face, the action operates as though its valve had no pressure applied against it.

FIGS. 11-13 show the "porch swing" embodiment of a Case 1 action.

A driver (not shown) cycles arm 101A to position guide 100, which is the embodiment's compliance member, between overtravel (FIG. 11) and apogee (FIG. 13). Pin block 105, which is rotatably cantilever mounted from gripe bucket 110, cycles valve stem 112 between seated position and apogee. Overtravel of guide 100 is resolved by deflection of its engagement against bracket 106 at limiting bench 102, which engagement is by way of arm 101 and its gudgeon 103. Forcing leaf-spring 104 opposes the deflection and provides seating force to valve stem 112 at overtravel. As guide 100 is swung towards mid-lift (FIG. 12), gudgeon 103 abuts limiting bench 102 and valve stem 112 comes to perigee. Outgoing force is buttressed against limiting bench 102 and bracket 106A, which are unyielding. With returning force beginning at roughly mid-lift, a burden is placed on forcing leaf-spring 104 through arm 101 to buttress approximately half the returning force. This buttressing ratio then decreases as guide 100 moves towards apogee. At apogee returning force is buttressed entirely against bracket 106A, through arm 101A.

The design geometry of every action of the instant invention is such that, for regular operation, the action must adequately resist deflection of its compliance member(s) from operative abutment against its limiting bench(es) under returning force at apogee. Each Case 1 action's returning force at apogee non-negatively forces the action's abutment. Case 2 actions (e.g. FIG. 14) must be geometrically configured so as to ensure substantial resistance to this deflection at apogee, yet also keep their forcing members from placing excessive force against the valve at seating.

To determine proper geometry of the action, a "moment plane" is defined that includes the pin member axis and is normal to its momentary path with respect to its guide. The moment plane is removed from the guide axis by a "signed distance," which is finite and signed as being positive at perigee. At apogee the signed distance is no more than two thirds of the signed distance at perigee, giving substantial resistance to deflection at apogee. The signed distance of Case 1 action FIG. 12 at apogee is zero, and in the Case 1 actions of FIGS. 2,4,7, and 9 it is negative. In these Case 1 actions the respective positions of moment plane and guide axis at perigee are either coincided or passed oppositely at apogee.

A general guide for the minimum values of Case 2 deflection resistance is found in prior art, spring-return action, practice. Since the return-spring in those actions is compressed at apogee it produces greater force than at valve seating. The ratio of the forces, at apogee and at seating, is roughly 3:2 for most engines and 2:1 for special purpose (such as racing) engines. The instant invention is defined so as to generally meet or exceed these outcomes.

Schematic FIG. 14 shows a Case 2 action.

A driver (not shown) cycles pin block 225 through overtravel, perigee, and apogee. Pin block 225 cycles the action's valve (not shown) between seated position and apogee. Overtravel (unit 22A and FIG. 15) is resolved by deflection of an abutment between guide 220, which is the embodiment's compliance member, and limiting bench 222. The deflection is opposed by force from forcing spring 224 effected between guide 220 and pin block 225 that seats the valve. As pin block 225 is moved from overtravel to perigee (unit 22B), the deflection vanishes and the valve is in lift. With the abutment in effect, each position of the driver determines a corresponding position of the valve. Outgoing force is solidly buttressed against limiting bench 222 and guide axle 223. Returning force is buttressed against both of forcing spring 224 and guide axle 223. As drawn, the signed distance at apogee (unit 22C) is less than ¼ the signed distance at perigee (unit 22B).

The instant invention is versatile, as illustrated in the embodiments here disclosed. Employment of the invention is anticipated in not only internal combustion engines but in other devices that use poppet valves, for instance air compressors. Its versions are robust for long operation, embodying simplicity of overtravel resolution while maintaining kinetically unyielding positive valve return.

The embodiments of the instant invention described in this specification are for the purposes of disclosure and not to be taken as limiting the invention as defined in the claims.

What is claimed is:

1. A mechanism for cyclically translating a valve between a seated position and a lifted position, comprising:
    a guide that is mounted for rotation about a first axis and a pin that is rotatably mounted about a second axis and mounted in a slot on the guide to describe a predetermined path with respect to the guide, the second axis being substantially parallel to the first axis;
    a driven member that is one of, the guide and the pin, that positions the guide and the pin with respect to one another;
    an output member that is one of, the guide and the pin, linked to participate in positioning the valve;
    an abutment that may be operatively effected against a limiting bench which said abutment unyieldingly limits a rotation of the guide about the first axis, each position of the driven member determining a position of the output member with the abutment in effect;
    a forcing member that opposes a deflection of the abutment, an instance of the deflection being produced by an overtravel of the driven member at valve seating;
    a moment plane that includes the second axis and is normal to its momentary path with respect to the guide, the moment plane being removed from the first axis at vestigial valve lift and which respective positions of the moment plane and the first axis are one of, coincided and passed oppositely, at maximal valve lift;
    whereby the abutment is forced by any non-zero moment on the guide about the first axis that is produced by kinetic positioning force at maximal valve lift.

2. The mechanism of claim 1 wherein the first axis is stationary.

3. The mechanism of claim 1 wherein the guide is driven along the pin, the pin being the output member.

4. The mechanism of claim 1 wherein the pin is driven along the guide, the guide being the output member.

5. The mechanism of claim 1 wherein the guide comprises a section that allows an overtravel position of the driven member to be varied without substantially affecting the deflection.

6. The mechanism of claim 1 wherein an hydraulic lash adjuster establishes a position of the limiting bench.

7. The mechanism of claim 1 wherein the deflection is forcibly opposed by a member that is activated independently of the mechanism.

8. A mechanism for cyclically translating a valve between a seated position and a lifted position, in which said mechanism:
    a guide and a pin may be positioned with respect to one another by a driven member that is one of, the guide and the pin, the guide being mounted for rotation about a first axis;
    the pin is rotatably mounted about a second axis and mounted in a slot on the guide to describe a predetermined path with respect to the guide, the second axis being substantially parallel to the first axis;
    one of, the guide and the pin, is an output member linked to participate in positioning the valve;
    a rotation of the guide about the first axis is unyieldingly limited by an abutment that may be operatively effected against a limiting bench;

each position of the driven member determines a position of the output member with the abutment in effect;

a deflection of the abutment is opposed by a force effected between the guide and the pin by a forcing member, an instance of the deflection being produced by an overtravel of the driven member at valve seating;

a moment plane includes the second axis and is normal to its momentary path with respect to the guide;

a signed distance between the moment plane and the first axis is greater than zero at vestigial valve lift;

and at maximal valve lift, the signed distance is no greater than two thirds of the signed distance at vestigial valve lift;

whereby a production of the deflection by kinetic positioning force at maximal valve lift is resisted by the mechanism.

9. The mechanism of claim 8 wherein at maximal valve lift, the signed distance is not greater than zero.

10. The mechanism of claim 8 wherein at maximal valve lift, the signed distance is no greater than one half of the signed distance at vestigial valve lift.

11. The mechanism of claim 10 wherein the first axis is stationary.

12. The mechanism of claim 10 wherein the guide is driven along the pin, and the pin is the output member.

13. The mechanism of claim 10 wherein the pin is driven along the guide, and the guide is the output member.

14. The mechanism of claim 10 wherein the guide comprises a section that allows an overtravel position of the driven member to be varied without substantially affecting the deflection.

15. The mechanism of claim 10 wherein an hydraulic lash adjuster establishes a position of the limiting bench.

16. The mechanism of claim 10 wherein the deflection is forcibly opposed by a member that is activated independently of the mechanism.

17. A method for cyclically translating a valve between a seated position and a lifted position, comprising:

providing a guide and a pin and a limiting bench and a forcing member;

mounting the guide for rotation about a first axis and mounting the pin for rotation about a second axis, the second axis being substantially parallel to the first axis;

mounting the pin in a slot on the guide to describe a predetermined path with respect to the guide;

positioning the guide and the pin with respect to one another by a driven member that is one of, the guide and the pin;

linking an output member that is one of, the guide and the pin, to participate in positioning the valve;

providing an unyielding limitation of the rotation of the guide about the first axis by an abutment that may be operatively effected against the limiting bench, each position of the driven member determining a position of the output member with the abutment in effect;

opposing with the forcing member a deflection of the abutment, an instance of the deflection being produced by an overtravel of the driven member at valve seating;

establishing a moment plane that includes the second axis and is normal to its momentary path with respect to the guide, the moment plane being removed from the first axis at vestigial valve lift and which respective positions of the moment plane and the first axis are one of, coincided and passed oppositely, at maximal valve lift;

whereby the abutment is forced by any non-zero moment on the guide about the first axis that is produced by kinetic positioning force at maximal valve lift.

18. The method of claim 17 wherein the first axis is stationary.

19. The method of claim 17 wherein the guide is driven along the pin, the pin being the output member.

20. The method of claim 17 wherein the pin is driven along the guide, the guide being the output member.

\* \* \* \* \*